US009075800B2

(12) United States Patent
Vollmert (10) Patent No.: US 9,075,800 B2
(45) Date of Patent: Jul. 7, 2015

(54) CONTEXT SWITCHING IN A BUSINESS APPLICATION (71) Applicant: SAP AG, Walldorf (DE)

(72) Inventor: Steffen Vollmert, Frankfurt (DE)

(73) Assignee: SAP SE, Walldorf (DE)

( * ) Notice: Subject to any disclaimer, the term of this patent is extended or adjusted under 35 U.S.C. 154(b) by 50 days.

(21) Appl. No.: 13/624,009

(22) Filed: Sep. 21, 2012

(65) Prior Publication Data
US 2014/0089348 A1 Mar. 27, 2014

(51) Int. Cl.
G06F 17/30 (2006.01)

(52) U.S. Cl.
CPC .......... *G06F 17/30* (2013.01); *G06F 17/30699* (2013.01)

(58) Field of Classification Search
CPC ................ G06F 2221/2141; G06F 17/30702; G06F 17/30699
USPC ......................................................... 707/785
See application file for complete search history.

(56) References Cited

U.S. PATENT DOCUMENTS

| 2009/0125361 | A1* | 5/2009 | Rossi ................................ 705/8 |
| 2009/0125831 | A1* | 5/2009 | Dandurand .................... 715/772 |
| 2011/0191346 | A1* | 8/2011 | Vernon et al. ................. 707/741 |
| 2012/0236356 | A1* | 9/2012 | Matsushima ................. 358/1.14 |
| 2012/0260192 | A1* | 10/2012 | Detweiler ....................... 715/745 |
| 2013/0097416 | A1* | 4/2013 | Barra et al. .................... 713/100 |
| 2014/0041055 | A1* | 2/2014 | Shaffer et al. ................... 726/28 |
| 2014/0068508 | A1* | 3/2014 | Capt et al. ...................... 715/808 |

* cited by examiner

*Primary Examiner* — Rehana Perveen
*Assistant Examiner* — Alexander Khong
(74) *Attorney, Agent, or Firm* — Klarquist Sparkman, LLP (57) ABSTRACT In a business application, contexts can be switched based on a selected customer. A first authorization profile can be associated with the business application. The authorization profile can restrict a user's ability to access, enter new or update existing information. In response to selection of a first element, such as a customer, the authorization profile can be switched to a second, different authorization profile with different read and/or write privileges. Context switching can also be used which includes additional features beyond the authorization profile. For example, personalization parameters that affect look and feel can be swapped. Additionally, available actions or pages accessible in the application can be swapped.

14 Claims, 9 Drawing Sheets

SOFTWARE 980 IMPLEMENTING DESCRIBED TECHNOLOGIES

CONTEXT SWITCHING IN A BUSINESS APPLICATION

BACKGROUND

Accounting, SCM, CRM, HCM, SRM (as well as all other ERP related data-entry-tasks) involves handling the daily business transactions for a company. This can include very diverse functions ranging from recording inventory stock levels in SCM, opportunity creation in CRM, reporting in HCM, incoming earnings to outgoing payments in financials, etc. In a particular example of financials, some accounting functions include bills or payments sent to vendors. It can also include cash, check, credit card and electronic payments received from customers; and checks written and received by a company. Payroll and tax deductions, along with the reconciling of company books for the year, are all accounting processes.

A financial audit is the verification of financial statements of a legal entity, with a view to express an audit opinion. The audit opinion is intended to provide reasonable assurance that the financial statements are presented fairly, in all material respects, and/or give a true and fair view in accordance with a financial reporting framework. The purpose of an audit is to enhance the degree of confidence of intended users in financial statements.

Several differences exist between an accounting and an audit. One important difference is that the audit checks the accounting process to determine its validity. Another difference: accounting is a daily process, whereas an audit is usually conducted annually or quarterly.

Whether considered accounting or an audit, for small companies, external experts are typically hired to review financial information. The experts often have an accounting degree and receive financial documents from multiple customers. The volume of documents can become unwieldy and the accountant can become confused which documents belong to which customers. Entering financial information (such as an invoice) into the wrong customer's financial data can be devastating and difficult to detect. The same is true in other business applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a business application, such as a financial application, can be used. A first authorization profile can be associated with the business application. The authorization profile can restrict a user's ability to access information. For example, the authorization profile can restrict the user's read and/or write privileges associated with data. In response to selection of a first customer, the authorization profile can be switched to a second, different authorization profile with new read and/or write privileges.

In another embodiment, a context can be switched that includes additional features beyond the authorization profile. For example, personalization parameters that affect look and feel can be swapped. Additionally, available actions or pages accessible in the application can be swapped.

In still another embodiment, an application other than a financial application can be used.

The foregoing and other objects, features, and advantages will become more apparent from the following detailed description, which proceeds with reference to the accompanying figures.

DETAILED DESCRIPTION

Figure 1:
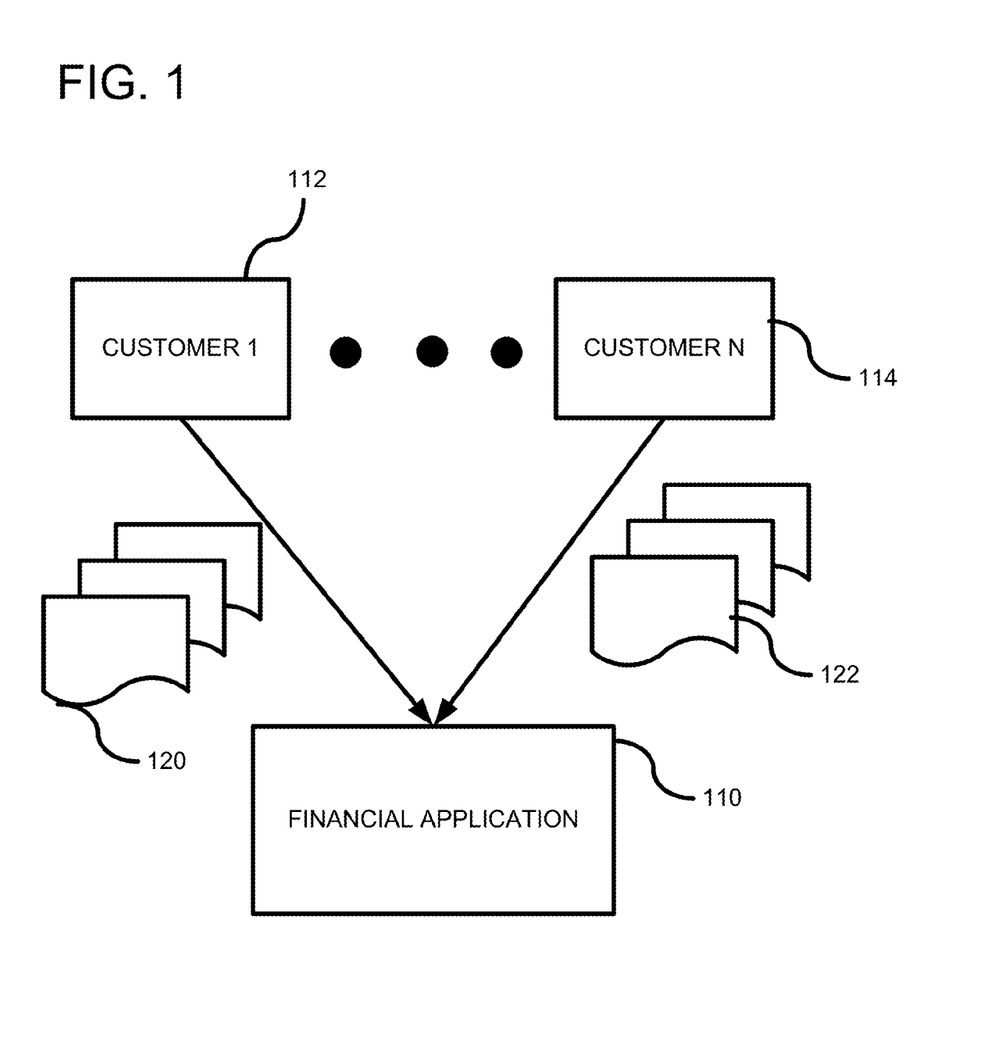
FIG. 1 illustrates an exemplary environment in which a financial application is executing including multiple customers passing documents for entry into the financial application.

FIG. 1 shows an exemplary embodiment in which a business application 110 described herein can be executed. The illustrated business application is a financial application. The description below discusses an example financial application that can be used, but it is understood that the embodiments can be used for any business application. Additionally, the example financial application illustrates a list of customers, but it should be understood that the list can be of any elements, such as materials. The financial application is typically used by an accountant or auditor in order to enter financial data associated with multiple customers, such as customer 1, shown at 112 through customer N, shown at 114, where N is any number. The accountant or auditor receives multiple financially related documents 120 from customer 1 and documents 122 from customer N. Such documents can be in any form, such as electronic documents or physical documents. The documents are typically invoices or expenses incurred by the customers and information should be retrieved from the documents by the accountant or auditor and entered into the financial application. As described further below, the financial application 110 has protections to ensure that data for one customer is not entered into data fields for a different customer. Such errors, once entered, are difficult to detect and can have significant implications on the customers.

Figure 2:
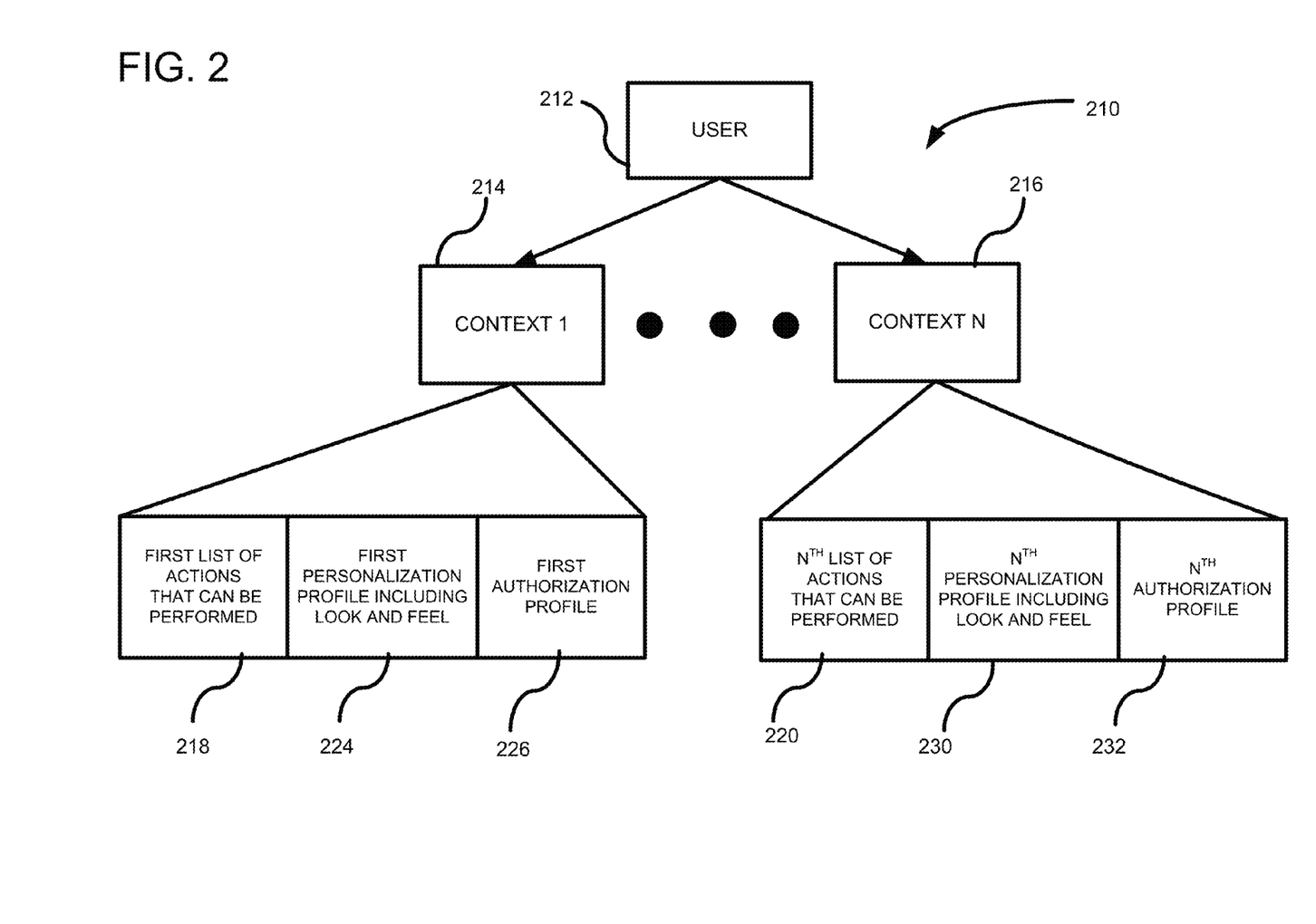
FIG. 2 is an exemplary hierarchical structure used for context switching between customers in the financial application.

FIG. 2 shows a hierarchical structure 210 that allows a user 212 to easily define actions, personalization profiles, and authorization profiles. Typically, a user logs onto a system using a user identification and password. In such a situation, the user has an initial authorization profile associated with the login and the authorization profile gives the user access to applications and data on the user's system. The financial application 110 (FIG. 1) allows the user to switch context, such as from a context 1, at 214, to a context N, shown at 216, where N is any number of available contexts. As described further below, context switching can be linked to a selected customer. When there is a context switch, multiple settings can be changed. For example, as shown at 218, if there is a context switch to context 1, a first list of actions can be performed at 218. Exemplary actions can include accounts payable, supplier invoicing and general ledger. A different example list of actions 220, as shown in context N, can be fixed assets and general ledger. Thus, the roles in which the accountant or auditor can act are defined through the actions. Additionally, different actions can be associated with different accessibility to pages of the application. As shown at 224, a personalization profile can also change based on the context. The personalization profile generally changes a look and feel of the user interface, which can include color change, font change, a persistent display of a customer logo, etc. Finally, at 226, an authorization profile can be changed. The authorization profile typically is associated with read and/or write restrictions and can be unique for each customer. Each context 1-N has an associated list of actions, personalization, and authorization profile. For example, context N is shown having a personalization profile 230 and an authorization profile 232 associated with that context. Additionally, each context 1-N can be linked to a company or customer. Thus, if the user selects a first company, context 1 can be used which limits the actions the user can take, changes the look and feel of the user interface, and changes the authorization profile for the user. A different company or customer can have a different context with different settings. By allowing switching of context, a user is given a visual indication of a current customer being worked on, as well as restrictions in what the user can enter as data. Such protections assist in reducing errors that can occur when entering data for a particular customer. It should also be recognized that although embodiments described are related to a financial application, a different type of application can be used. For example, Supply Chain Management, Customer Relation Management, Supplier Relation Management, Human Capital Management and other industry specific business applications can be used.

Figure 3:
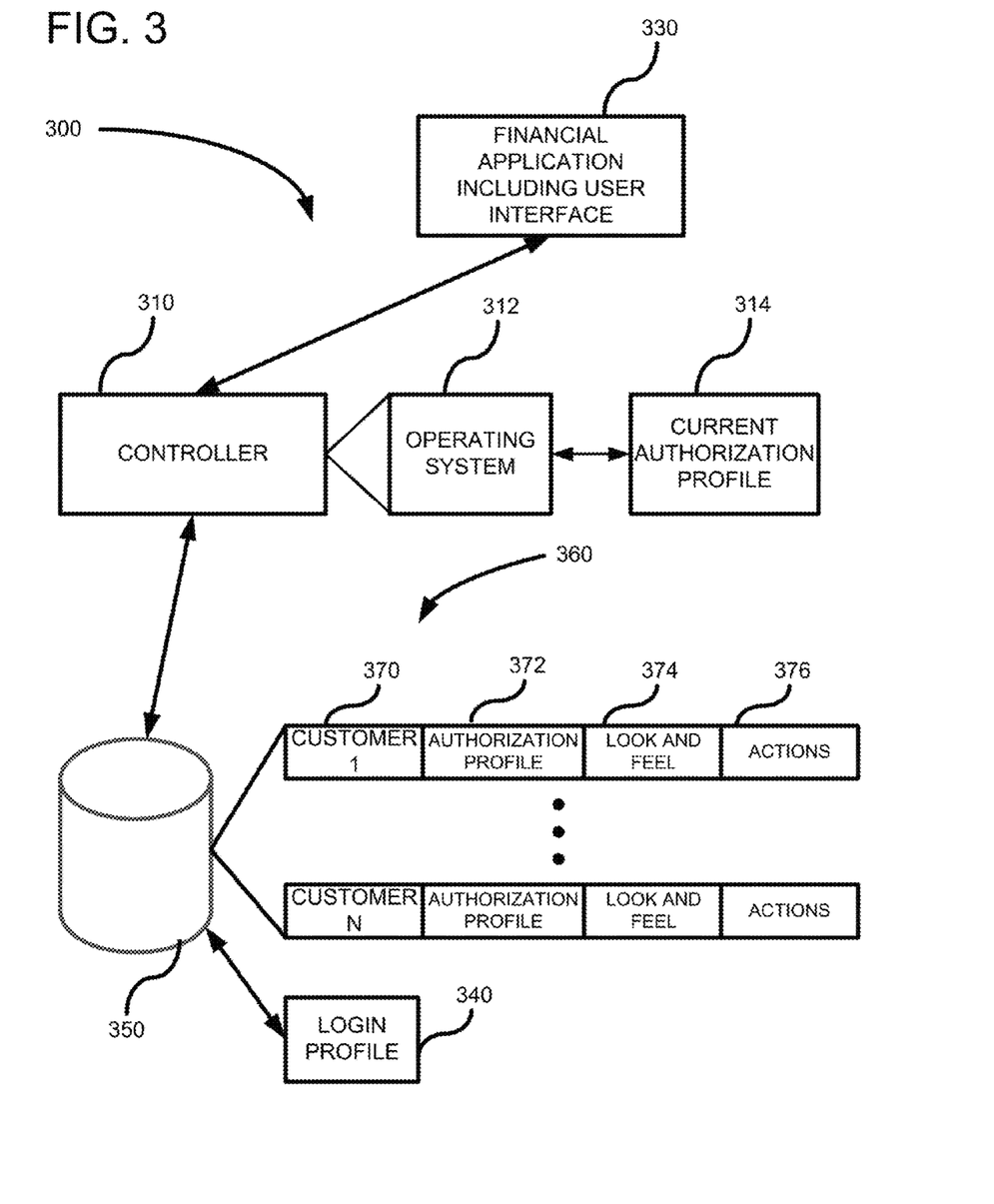
FIG. 3 shows a system implementing the hierarchical structure of FIG. 2.

FIG. 3 shows a system diagram of a computer system 300 that can be used to allow context switching between customers. The computer system can be a stand-alone computer or a network-based system that is being accessed by a user through a browser interface or other light-weight application. The computer system 300 includes a controller 310 (such as a processor, microcontroller, etc.) executing an operating system 312. A current authorization profile 314 used and is stored in system settings. The authorization profile 314 can provide read and/or write restrictions associated with the computer system 300 and limits the capabilities of the user. Typically, when a user first logs onto the system 300 using a user identification and password, a login authorization profile 340 is copied to the current authorization profile associated with the user, which is stored at 314. A financial application 330 includes a user interface that allows a user to select different customers for which to enter financial data. A database 350 stores a data structure 360 associated with different customers 1-N, where N is any number of customers. Different data fields can be used depending on the design, but the particular example shows a customer field 370, an authorization profile field 372, a look and feel field 374, and an actions field 376. A list of available customers can be displayed in the financial application 330. When a user selects a particular customer, an API call can be made with a customer identifier as a parameter to change the current authorization profile 314. In response to the API call, the customer identifier can be used as a key to accessing the data structure 360. Once the customer associated with the customer identifier is found, the associated authorization profile (e.g., 372 for customer 1) can be copied to the current authorization profile 314 to be used by the system 300. Thus, read and/or write restrictions associated with the financial application 330 can be changed based on the selected customer in the financial application. Additionally, a look-and-feel field (e.g., 374 for customer 1) used by the financial application 330 can be displayed. For example, a persistent logo can be displayed regardless of which page of the application a user accesses. Additionally, a customer-associated color and font can be displayed. Finally, which pages of the application are accessible can be controlled using the actions field (e.g., 376 for customer 1). Once the user is finished working on the financial data for a particular customer, the user can exit the customer pages. In response, the login profile 340 can be reinstated as the current authorization profile 314 used by the system.

Although the above example is for context switching between customers, it can be used for any element, such as materials, etc.

The structure shown in FIG. 3 is one structure that can be used, but other system architectures can be used. For example, the current authorization profile can be stored in folders associated with the financial application 330, rather than being a system setting accessible by the operating system 312.

Figure 4:
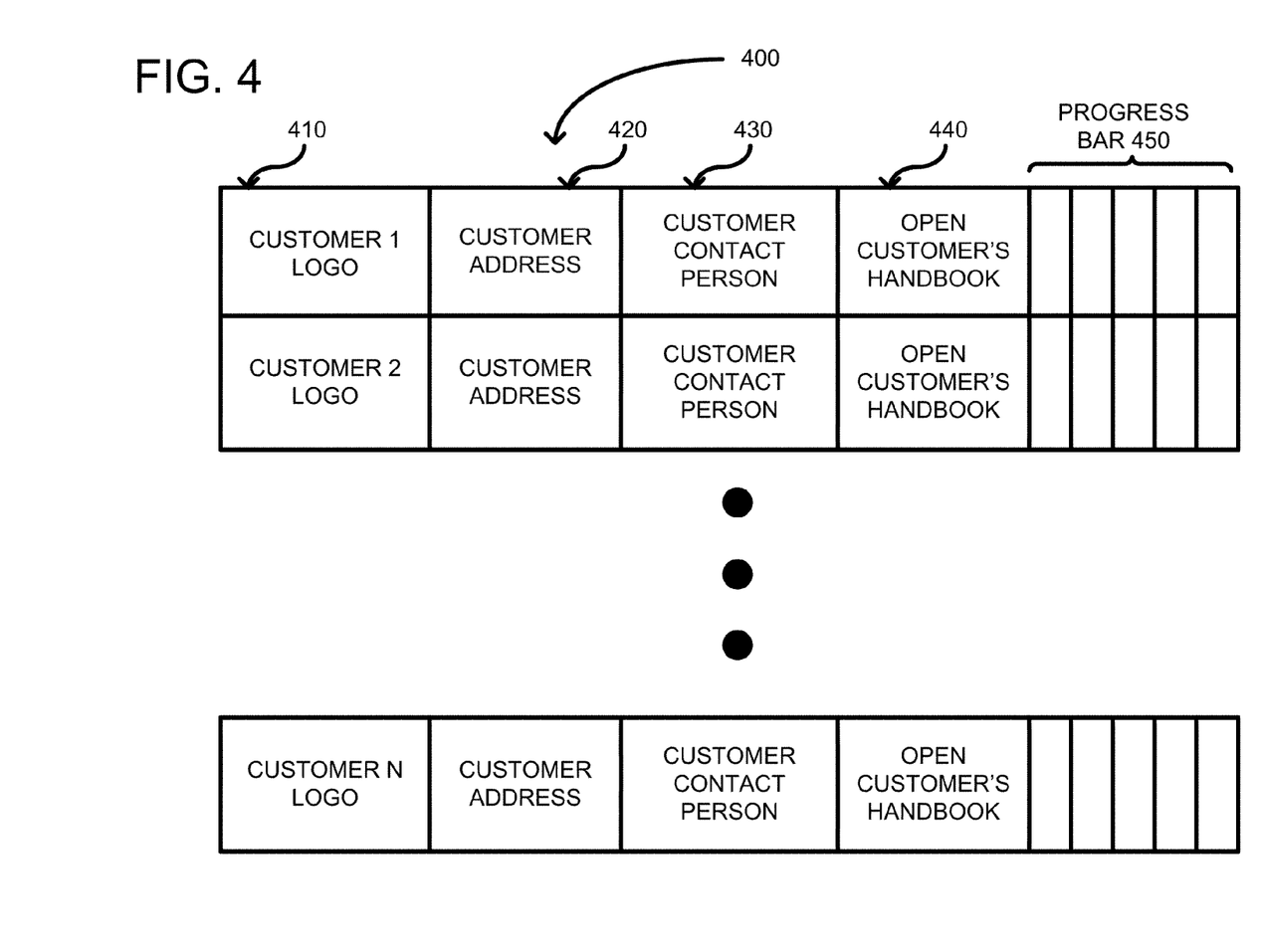
FIG. 4 shows an exemplary user interface including a list of customers.

FIG. 4 shows an example user interface 400 that can be used in association with the financial application 330 of FIG. 3. The user interface 400 is only an example and additional information can be displayed or some of the information can be eliminated. The exemplary information displayed includes a list of customer logos 410 and the following information associated with each customer: a customer address 420, a customer contact person 430, a link to further customer information 440, and a progress bar 450. As further described below, the progress bar 450 includes a plurality of milestones (shown as separate boxes) for entering financial information. The milestones can have colors associated therewith for assisting in recognizing a status. For example, green can indicate completed, yellow can indicate nearly completed, and red can indicate that much work remains. From this application page, a login profile 340 (FIG. 3) can be used as the current authorization profile 314. However, if a customer logo 410 is selected, a customer identifier associated with the logo can be used to implement a context switch while loading an application page associated with that customer. For example, the database 360 (FIG. 3) can be searched for the associated customer and, once found, the customer-specific authorization profile can be swapped for the current authorization profile 314.

Figure 5:
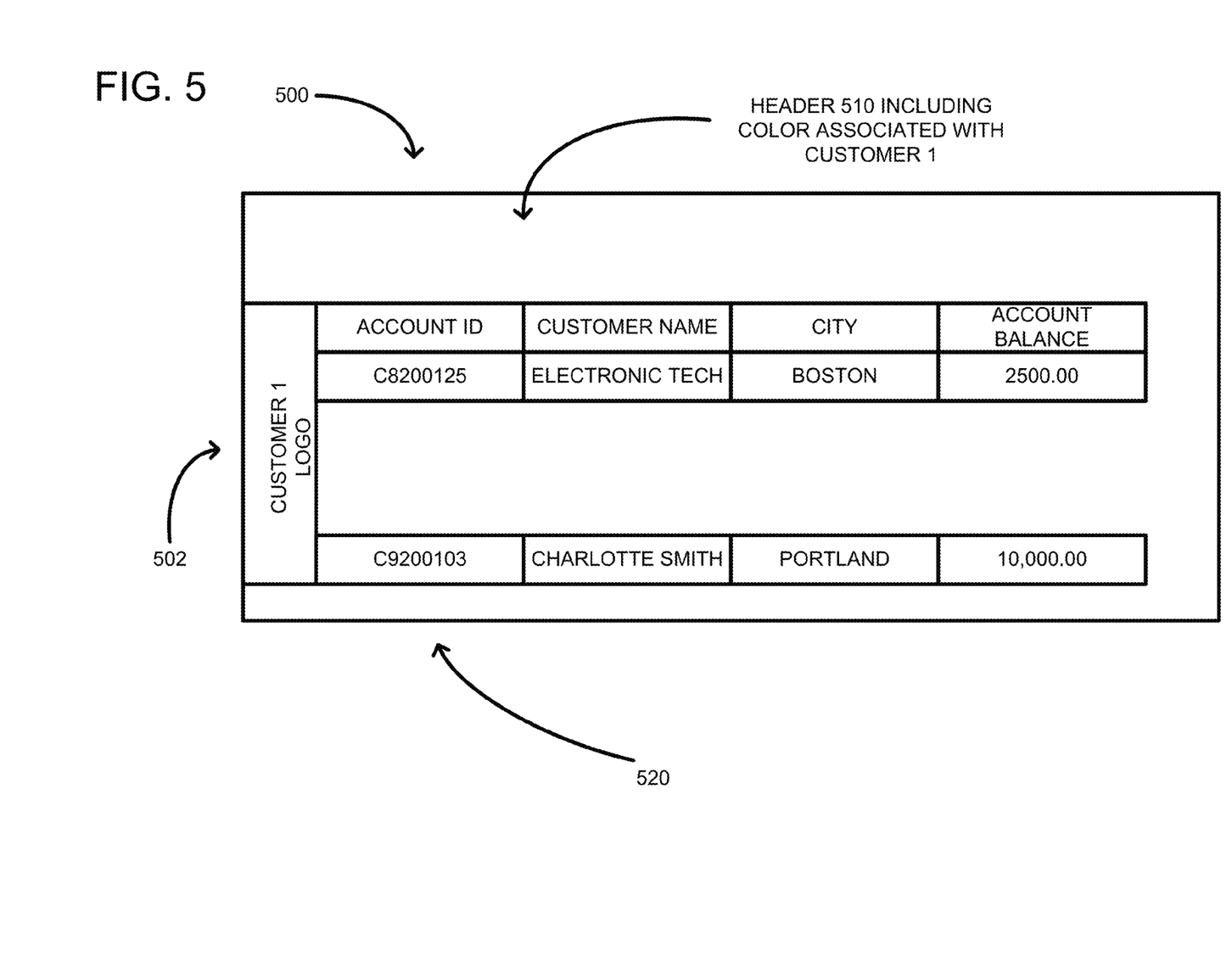
FIG. 5 shows a customer page with look and feel parameters applied to the page.

FIG. 5 shows an example customer page 500 that can be displayed in response to selecting a customer logo from the list of customer logos shown in FIG. 4. In this example, customer 1 was selected. In response, a customer 1 specific page is presented that shows information associated with that customer. The customer 1 specific page has a look and feel associated with customer 1, which can be different than the look and feel of other customer pages. At 502, a persistent customer 1 logo is displayed. The logo 502 is persistent because it can be displayed across all pages associated with customer 1. Additionally, a header 510 can be displayed that is in a color associated with the customer. The header 510 can also be persistent and displayed across application pages associated with customer 1. A variety of data fields 520 can be displayed in association with customer 1. The data fields are in a particular font and font size that can also be associated with customer 1. Other look and feel parameters can be associated with customer 1. The various data fields are merely exemplary and include an account identifier, customer name, city and invoice amount. Such data fields represent financial information generally.

Figure 6:
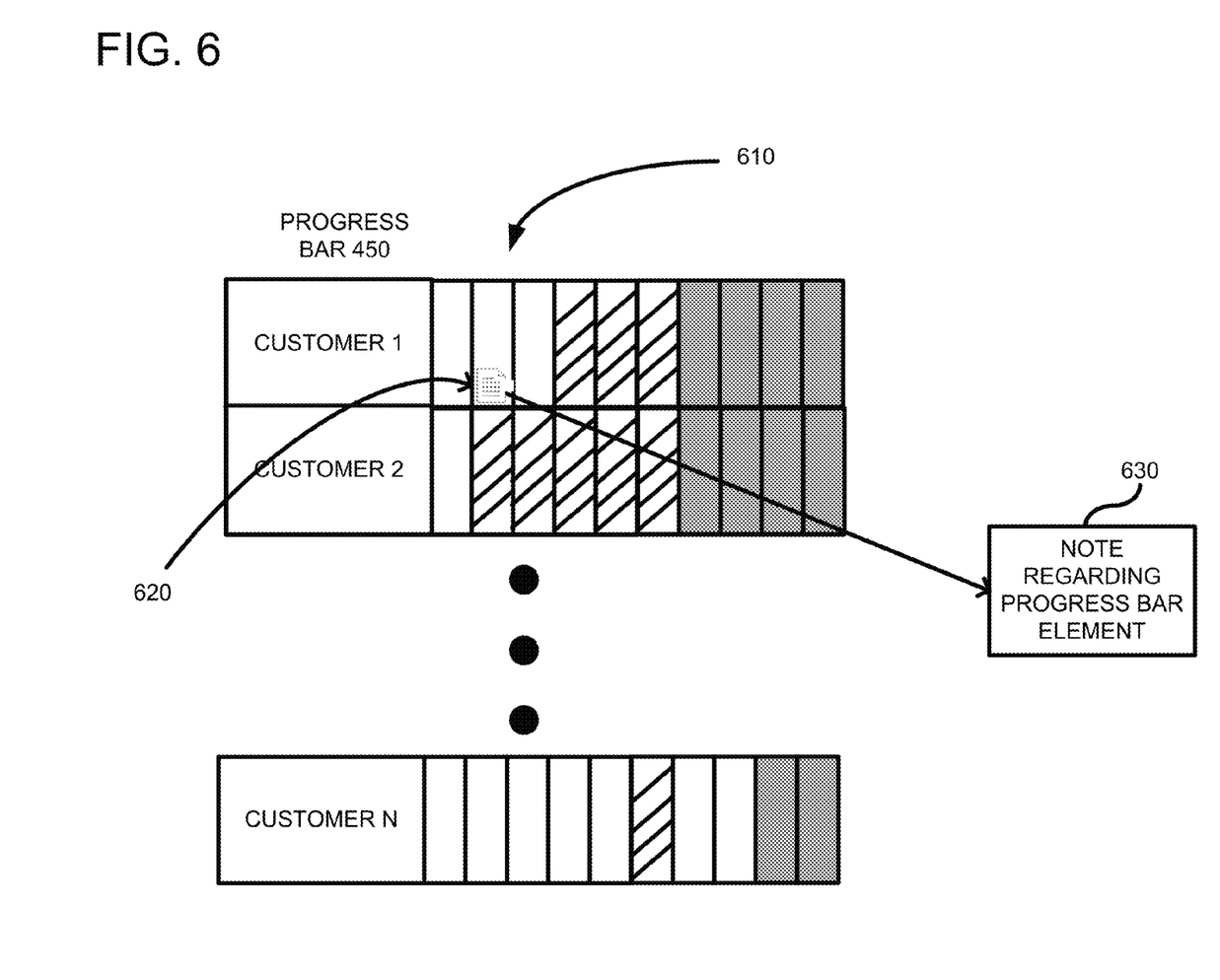
FIG. 6 shows an exemplary progress bar with status of entering certain financial documents.

FIG. 6 shows further details of the multi-color progress bar 450 of FIG. 4. The progress bar can be accessed through selection (e.g., clicking) anywhere in the vicinity of the illustrated progress bar 450. The progress bar can be multicolored so that a user can quickly access a state of entering financial information and whether milestones or deadlines have been reached. For example, each block, shown generally at 610, can be associated with a date and different colors can indicate whether financial documents were timely posted. Cross-hatching is illustrated to indicate a certain color (e.g., yellow indicating nearly complete), grey can represent another color (e.g., red indicating not complete) and white can represent completion of deadlines by that date. A note indicator 620 can be associated with a note 630 for displaying additional information relevant to the deadline.

Figure 7:
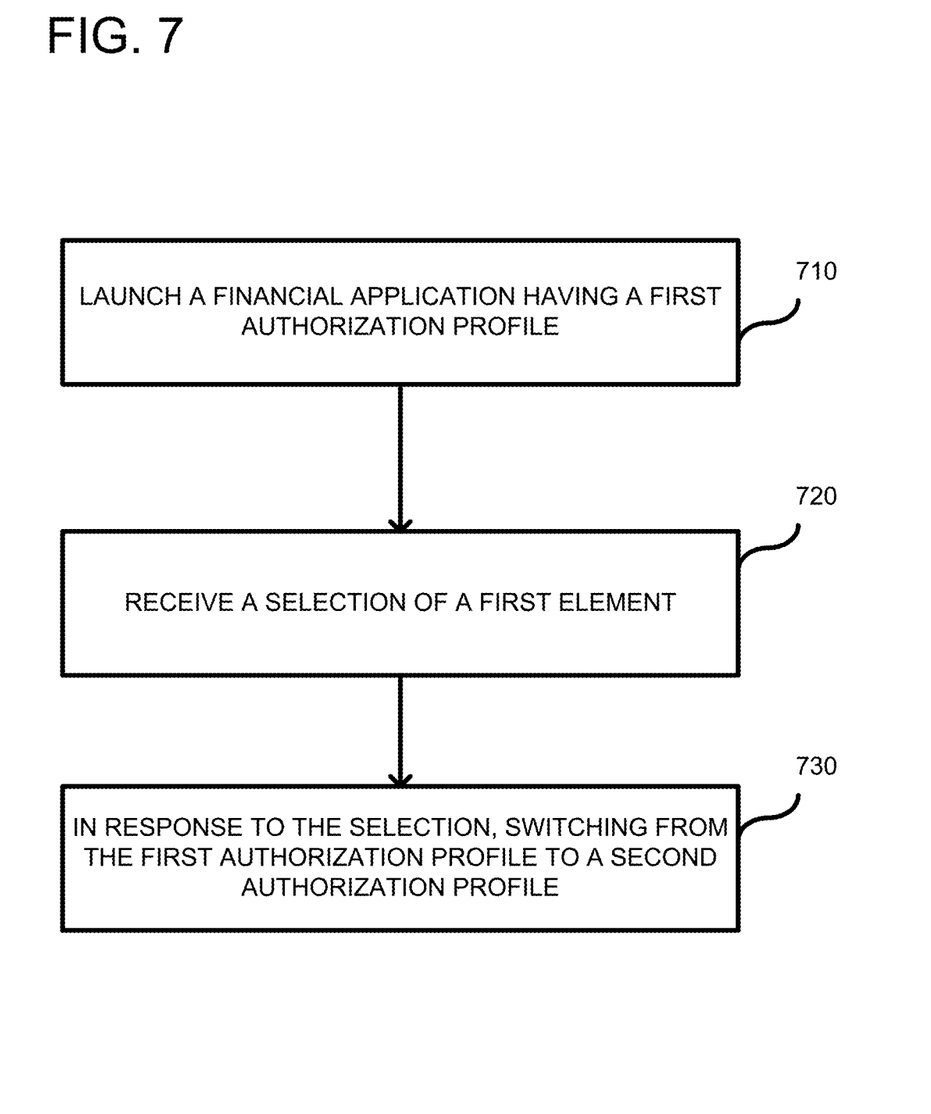
FIG. 7 is an exemplary flowchart of a method for switching authorization profiles.

FIG. 7 is an exemplary flowchart of a method for switching authorization profiles. In process block 710, a financial application (or any business application) can be launched having a first authorization profile. For example, when launched, the application can have the login profile 340 (FIG. 3) associated with the system. In process block 720, a user can select a first element, such as a client, customer, or other material. For example, a list of customers can be presented, such as was shown at 410 in FIG. 4, and a user can select (e.g., click on) one of the customers. At process block 730, in response to the selection, the authorization profile can be switched from the first authorization profile to a second authorization profile. Thus, read and write permissions associated with the financial application can be changed due to the swapping of the authorization profiles. The user can then enter financial information associated with the customer and the customer-associated authorization profile can assist in ensuring the correct data associated with that customer is being entered.

Figure 8:
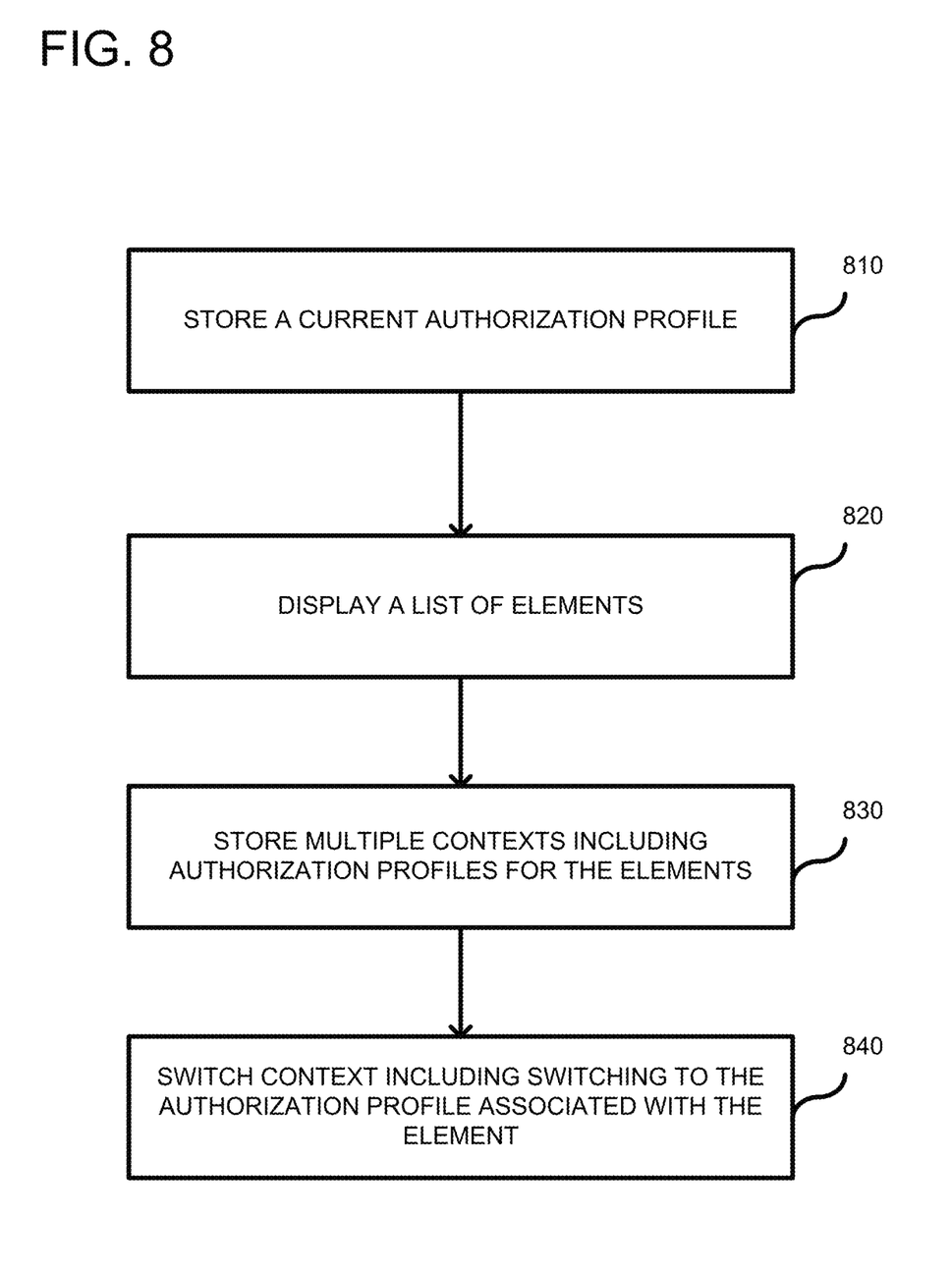
FIG. 8 is another exemplary flowchart of a method for switching context.

FIG. 8 shows a flowchart of an embodiment for context switching in a financial application (or other business application). In process block 810, a current authorization profile is stored. In process block 820, a list of elements (e.g., customers) can be displayed. Any of the elements in the list can be selected as a request to enter financial information associated with the selected element. In process block 830, a plurality of contexts can be stored including authorization profiles for the elements. The context can include personalization components, allowable actions, etc. In process block 840, a context switch occurs in response to selection of an element from the list. When the context switches, at least the authorization profile associated with the element also switches to change the read and/or write restrictions.

Figure 9:
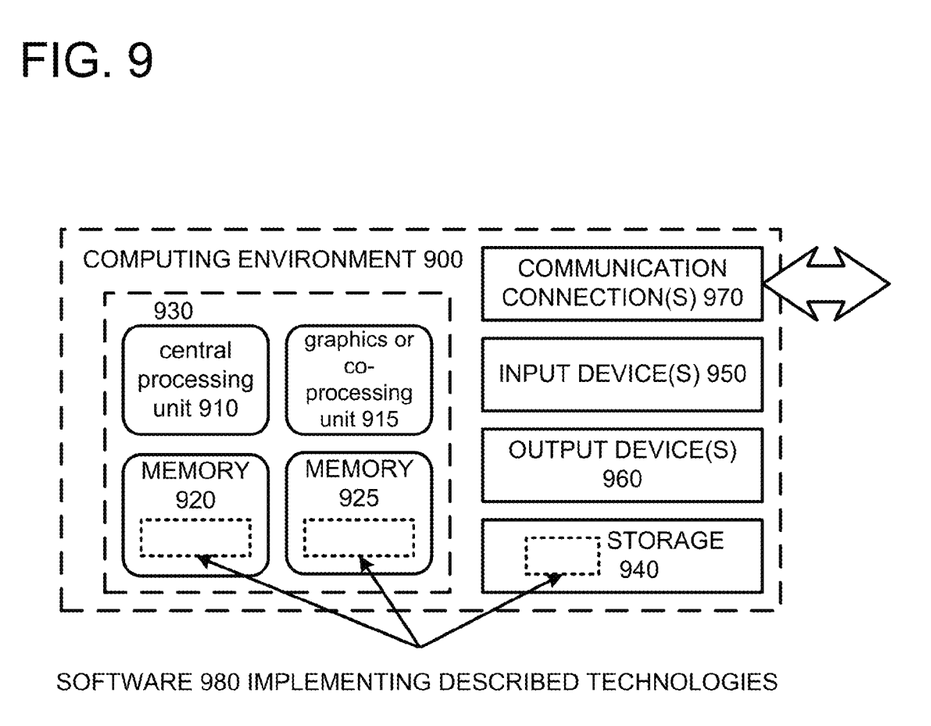
FIG. 9 is an exemplary computer environment in which the embodiments herein can be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, media player, gaming system, mobile device, etc.)

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. For video encoding, the input device(s) 950 may be a camera, video card, TV tuner card, or similar device that accepts video input in analog or digital form, or a CD-ROM or CD-RW that reads video samples into the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). As should be readily understood, the term computer-readable storage media does not include communication connections, such as modulated data signals. Any of the computer-executable instructions for implementing the disclosed techniques as well as any data created and used during implementation of the disclosed embodiments can be stored on one or more computer-readable media (e.g., non-transitory computer-readable media, which excludes propagated signals). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles described herein may be applied, it should be recognized that the illustrated embodiments are only preferred examples and should not be taken as limiting their scope. Rather, the scope of the embodiments are defined by the following claims. We therefore claim all that comes within the scope of these claims.

I claim:

1. A method of accessing business information, comprising:

after a user logs onto a system, launching an application used for accessing business information, the application being associated with a login authorization profile as a current authorization profile, the login authorization profile defining at least read and write restrictions in the system;

providing for display, a list of customers in the application;

storing multiple contexts including authorization profiles for the customers in the list;

in response to receiving a selection of one of the customers, switching to a customer specific context including switching from the current authorization profile to an authorization profile associated with the selected customer;

wherein the current authorization profile provides a first set of read and write restrictions and the authorization profile associated with the selected customer provides a second set of read and write restrictions, different than the first set;

wherein the current authorization profile is associated with a first look and feel, and the authorization profile associated with the selected customer is associated with a second look and feel different than the first look and feel, and the method further includes switching from the first look and feel to the second look and feel, wherein the first and second look and feel comprise at least one of a color, a font, or a persistent display of a customer logo.

2. The method of claim 1, wherein each customer in the list has a unique authorization profile.

3. The method of claim 1, further including switching application pages available for display to a user.

4. The method of claim 1, further including providing for display a multi-colored progress bar that indicates whether business documents were timely posted in the business application.

5. The method of claim 4, further including providing for display a note in association with the multi-colored progress bar.

6. The method of claim 1, further including in response to receiving user input, checking the authorization profile associated with the selected customer to ensure that permissions are available.

7. One or more non-transitory computer-readable media having instructions thereon for executing a method for accessing business information, the method comprising:

after a user logs onto a system, using a login authorization profile as a current authorization profile;

launching an application and using the current authorization profile for the application;

providing for display, a list of elements in the application associated with the login authorization profile;

storing multiple contexts including authorization profiles for the elements in the list;

in response to receiving a selection of one of the elements, switching to an element specific context including switching from the current authorization profile to an authorization profile associated with the selected element, wherein the authorization profile associated with the selected element is different than the current authorization profile and actions available to the user of the application change based on the switching; and in response to receiving an indication of deselecting the previously selected customer, switching context to the login authorization profile;

wherein at least one of the multiple contexts includes a look and feel associated with the elements, wherein the look and feel is associated with at least one of the following: a font, a color, or a persistent customer logo.

8. The one or more non-transitory computer-readable media of claim 7, wherein a context further includes actions that are authorized for a particular element.

9. The one or more non-transitory computer-readable media of claim 7, wherein the authorization profile includes read and/or write restrictions associated with data of the selected element.

10. The one or more non-transitory computer-readable media of claim 7, further including providing information to display a progress bar associated with each element, the progress bar indicating whether certain business documents were entered by predetermined dates.

11. The one or more non-transitory computer-readable media of claim 7, wherein the elements are customers, and further including associating actions that can be performed in the application with the contexts so that each customer is associated with different actions that can be performed.

12. A system for managing business information, comprising:

a database including a plurality of authorization profiles associated with different elements for which business information can be entered, the authorization profiles provide read and write restrictions depending on the authorization profile;

a user interface associated with an application that is launched after a user logs onto the system, the user interface for displaying a list of the elements associated with a login authorization profile; and a hardware controller for switching between the plurality of authorization profiles associated with the application depending on which element is selected from the list of elements;

wherein the authorization profile associated with the selected element is different from the login authorization profile and actions available to the user in the application change based on the selected element;

wherein the database further includes a plurality of look and feels for the user interface, wherein each authorization profile is associated with a different look and feel, so that when a different authorization profile is used, a corresponding look and feel is displayed on the user interface, the look and feel including at least one of a font, a color or a persistent client logo.

13. The system of claim 12, wherein each authorization profile is associated with different read and write restrictions.

14. The system of claim 12, wherein the user interface further includes a progress bar associated with business transactions for each element in the list of elements.

* * * * *